(12) United States Patent
Coulthard et al.

(10) Patent No.: US 9,424,095 B2
(45) Date of Patent: Aug. 23, 2016

(54) METHOD AND SYSTEM FOR CONTROLLING THE PROCESSING OF REQUESTS FOR WEB RESOURCES

(75) Inventors: Adam Coulthard, Southampton (GB); Daniel Edward Would, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1482 days.

(21) Appl. No.: 11/561,967

(22) Filed: Nov. 21, 2006

(65) Prior Publication Data

US 2007/0124446 A1    May 31, 2007

(30) Foreign Application Priority Data

Nov. 25, 2005  (GB) .................................. 0524008.0

(51) Int. Cl.
| | |
|---|---|
| *G06F 15/16* | (2006.01) |
| *G06F 9/50* | (2006.01) |
| *G06Q 10/06* | (2012.01) |

(52) U.S. Cl.
CPC ................ *G06F 9/505* (2013.01); *G06Q 10/06* (2013.01); *G06F 2209/5021* (2013.01)

(58) Field of Classification Search
CPC . H04L 65/80; G06F 9/505; G06F 2209/5021; G06Q 10/06
USPC .......................................... 709/207, 223, 240
See application file for complete search history.

(56) References Cited

U.S. PATENT DOCUMENTS

| | | | | |
|---|---|---|---|---|
| 5,848,297 | A  * | 12/1998 | Krein et al. ..................... 710/56 |
| 6,067,545 | A  * | 5/2000  | Wolff |
| 6,243,761 | B1 * | 6/2001  | Mogul et al. .................. 709/246 |
| 6,324,570 | B1 * | 11/2001 | Tonchev et al. ............... 709/207 |
| 7,013,333 | B1 * | 3/2006  | Skells .......................... 709/223 |
| 7,406,539 | B2 * | 7/2008  | Baldonado et al. ........... 709/240 |
| 7,454,457 | B1 * | 11/2008 | Lowery et al. ................ 709/203 |
| 7,624,047 | B1 * | 11/2009 | Round ......................... 705/26.1 |
| 2001/0029523 | A1 * | 10/2001 | Mcternan et al. ............. 709/205 |
| 2003/0236903 | A1 * | 12/2003 | Piotrowski ..................... 709/231 |
| 2004/0015777 | A1 * | 1/2004  | Lei et al. ...................... 715/500 |
| 2009/0013083 | A9 * | 1/2009  | Garcia-Luna-Aceves et al. ............................ 709/229 |
| 2009/0043934 | A1 * | 2/2009  | Bjerregaard .................. 710/244 |

FOREIGN PATENT DOCUMENTS

WO    WO 03/098900 A1    11/2003

* cited by examiner

*Primary Examiner* — June Sison
*Assistant Examiner* — Steven Nguyen
(74) *Attorney, Agent, or Firm* — Steven M. Greenberg, Esq.; CRGO Law

(57) ABSTRACT

A system, method and computer program product for controlling the processing of requests for web page resources from a web server are provided. The method comprises monitoring a run level of the web server; receiving requests for one or more web page resources; determining a priority of received requests based on a run level value associated with a requested resource and the run level of the web server; and processing the requests by the web server according to the determined priority. In dependence on the current load on the web server, requests for low priority resources can be given a low processing priority, with processing capability focussed on requests for higher priority web resources.

20 Claims, 4 Drawing Sheets

METHOD AND SYSTEM FOR CONTROLLING THE PROCESSING OF REQUESTS FOR WEB RESOURCES

FIELD OF THE INVENTION

The present invention relates to the field of data processing and in particular to a method and system for controlling the processing by a web server of requests for web resources.

BACKGROUND OF THE INVENTION

The World Wide Web (WWW) is the Internet's multimedia information retrieval system. In the Web environment, client machines communicate with Web servers using the Hypertext Transfer Protocol (HTTP). The Web servers provide users with access to resources, which may be any type of content that can be stored in a file and presented to a user, such as program files, media files, text, graphics, images, sound, video, etc. Page description languages, such as Hypertext Markup Language (HTML) or eXtensible Markup Language (XML), are often used to describe web pages. HTML provides basic document formatting and allows the developer to specify connections known as hyperlinks to other servers and files. XML is used to represent the content and structure of data without describing how to display the information, with a stylesheet or schema provided for applying visual formatting to the XML document.

In the Internet, a network path to a server is identified by a resource address called a Uniform Resource Locator (URL), and has a special syntax for defining a network connection. Application programs called web browsers, which run on client computer systems, enable users to access resources by specification of a link via the URL and to navigate between different HTML/XML pages. Most browsers natively support a variety of formats in addition to HTML, such as the JPEG™, PNG and GIF™ image formats, and can be extended to support more through the use of plug-ins. The type of content contained in an HTTP message is identified by an HTTP content type. This allows web page designers to embed images, animations, video, sound, and more into a web page, or to make them accessible through the web page.

HTTP is a request/response protocol between clients and servers. An HTTP client, such as a web browser, typically initiates a request by establishing a Transmission Control Protocol (TCP) connection to a particular port on a remote host (port 80 by default). An HTTP server listening on that port waits for the client to send a request string, such as "GET/HTTP/1.1" (which would request the default page of that web server), followed by an email-like MIME (Multipurpose Internet Mail Extensions) message that has a number of informational header strings that describe aspects of the request, followed by an optional body of arbitrary data.

A web browser normally performs many requests to get a single webpage. The web server first delivers the HTML file for the page. From this the web browser makes a list of the resources that are embedded in the page and which it needs to request as well. Once this list is complete, the web browser issues more requests, one for each resource of the page it needs (images, inline midi, etc.). If, for example, you direct your browser to get www.ibm.com/uk/, the browser will assume the prefix 'http://', connect to port 80 of the server that has the Domain Name Service (DNS) name: www.ibm.com, and issue the command: GET/UK HTTP/1.0. By convention, a path name that ends in a directory name rather than a simple file name refers to a file in that directory called index.html. The web server thus sends the resource file called index.html and the browser starts rendering index.html as it comes across, and starts building an index of any embedded files it needs. The browser then issues GET commands for each other file it needs and renders them into the page as it receives them.

In HTTP version 1.0, the client requests one resource per HTTP request. If a web page contains a plurality of images, say eight images, then the browser will issue a total of nine requests to obtain the entire contents of the page, that is the HTML plus the images. Typically, browsers make several requests concurrently to reduce the overall delay to the user. Later versions of HTTP, such as HTTP v 1.1, use persistent connections that remain open over a series of request-reply exchanges.

The speed of download of a web page by a web browser is dependent, amongst other factors, upon the load on the web server. This load can vary greatly and depends in turn on factors such as the demand at any one time for the pages that it hosts. Certain types of web sites are particularly affected by peaks in demand, such as those that display news items. Such a web site may normally have a moderate numbers of users, but when a new story breaks, or a particular story hosted on the web server is included as a link on a major news site, the web server may suddenly experience a load potentially hundreds of times what it is used to. This interest is often directed at a specific item, such as a block of text or image on the page, but every page download request will result in a number of additional features that make up the web page being downloaded, in addition to those specific items. In the normal course of operation of the web server a website provider/developer would like these additional items to be seen by users, but in a critical load situation these take up extra bandwidth. This can lead to many users not receiving the part of the page that they wish to look at, but receiving other parts of the page instead; and others receiving error messages that the server is currently unavailable.

Another factor affecting load on a web server is the time of day. Typically 9 am Monday morning will see considerable load on a company's intranet server compared to the average over a given week. During such a time of load it is unhelpful and frustrating for employees to be waiting long for the essential part of a page to load, whilst, for example, old items are downloaded.

As more and more people start interacting, researching and shopping on-line the problem of peak loads and effective content delivery will become more pronounced. The present invention aims to address these problems.

SUMMARY OF THE INVENTION

A first aspect of the present invention provides a method for controlling the processing of requests for web page resources from a web server. The method comprises monitoring a run level of the web server; receiving requests for one or more web page resources; determining a priority of received requests based on a run level value associated with requested resources and the run level of the web server; and processing the requests by the web server according to the determined priority.

This means that, in dependence on the current load on the web server, requests for resources denoted as being of low priority can be given a low processing priority, with processing capability being instead focussed on requests for higher priority web resources.

A second aspect of the invention provides a system for controlling the processing of requests for web page resources from a web server. The system comprises a file system and monitoring, determining and processing components. The monitoring component monitors a run level of the web server. The file system includes a plurality of web page resources and run level values associated with the web page resources. The receiving component receives requests for one or more web page resources; the determining component determines a priority of requests received by the receiving component; and the processing component processes the received requests according to the determined priority.

Preferred embodiments enable a website developer to control the sequence of web content delivery by a web server, by allocating a priority to different resources of a web page. This allocation may be done by the developer, or automatically according to a set of rules that gives a certain importance to different types/sizes of resources. The web server can control the way in which a web page is viewed, and supply critical content with a higher priority at times when there is a peak in demand.

When the website developer has indicated what content on the site has high or low priority, the runtime environment can utilize that information to autonomically adjust page content to allow a graceful transition from full featured during 'normal' operation, down to a low-resolution static holding page in extreme conditions, to minimise the failure of delivery of the content desired by customers.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
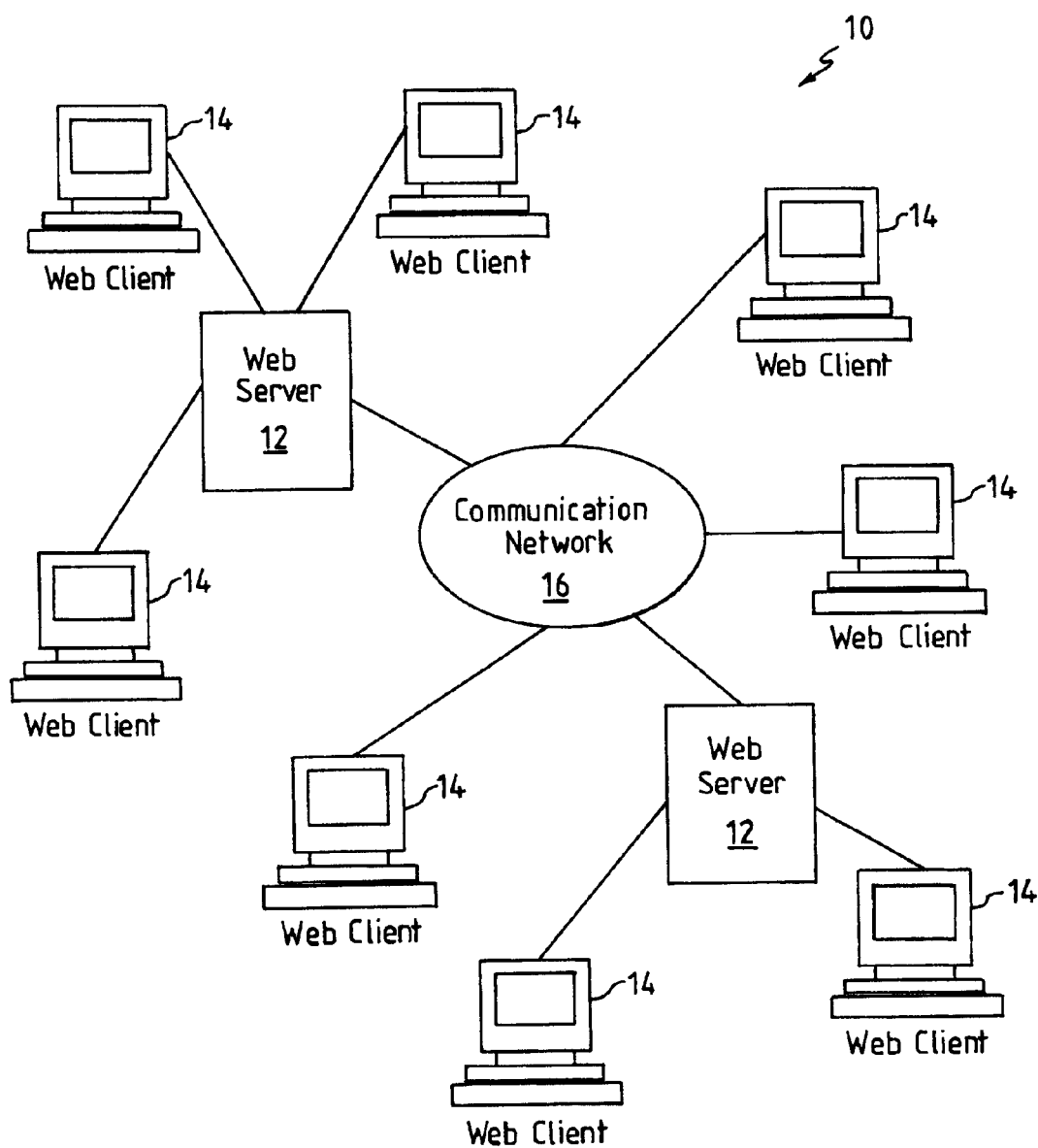
FIG. 1 is a block diagram of a computer network within which the present invention is implemented.

FIG. 1 shows a conceptual diagram of the well known Internet computer network 10 within which the present invention can be implemented. The Internet 10 is based on a client server model and comprises a large network of Web servers 12 that are accessible by a plurality of Web clients 14 over a communication network 16.

Figure 2:
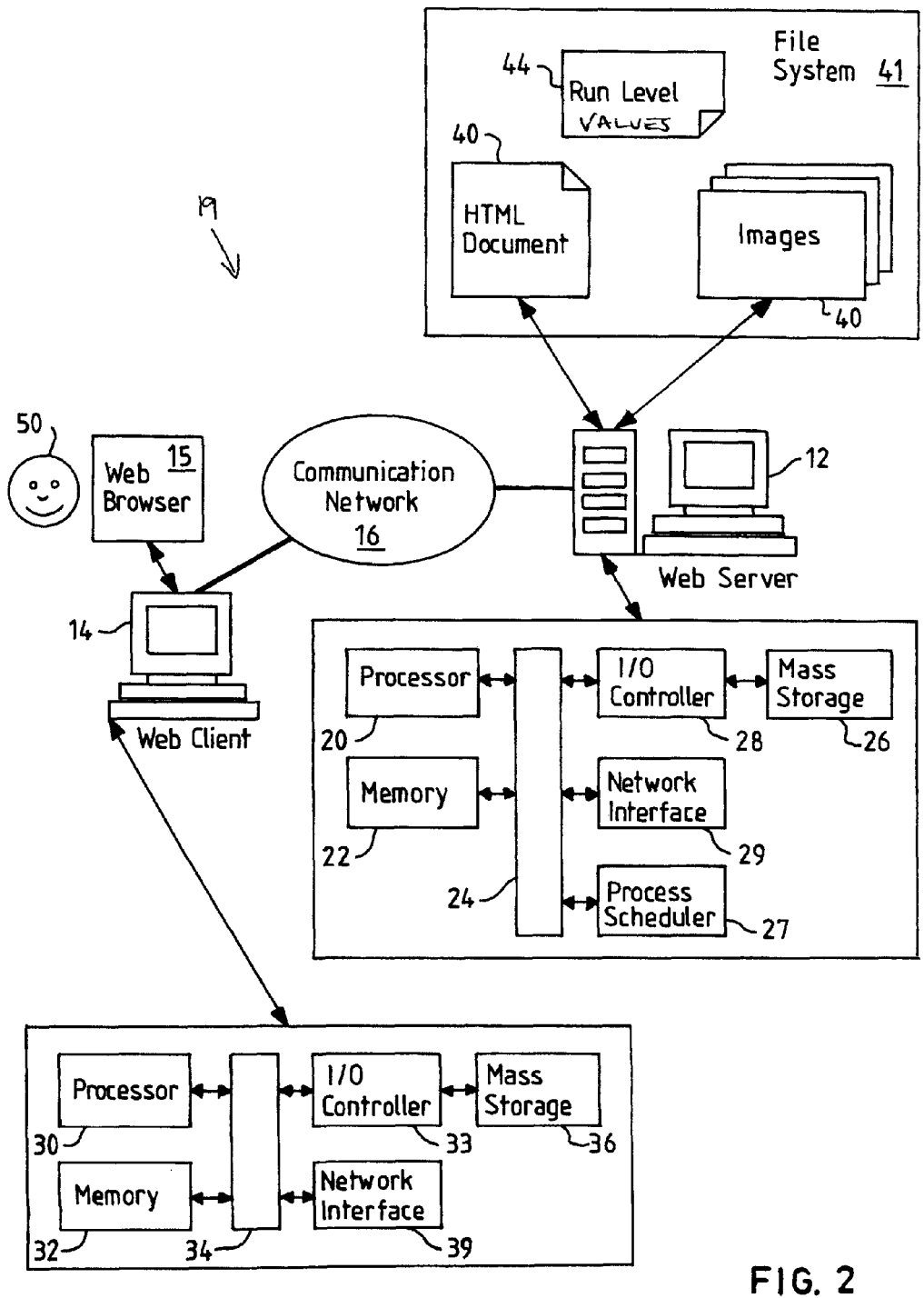
FIG. 2 is a schematic diagram of a Web server and a Web client of FIG. 1 illustrating the interaction between server and client.

FIG. 2 shows a computer system 19 comprising a Web server 12 and Web client 14 connected over communication network 16. The hardware components of Web server 12 and Web client 14 are shown in greater detail.

Web server 12 includes conventional components such as a processor 20, memory 22 (e.g. RAM), a bus 24 that couples the processor 20 and memory 22, a mass storage device 26 (e.g. a magnetic or optical disk) coupled to the processor 20 and memory 22 through an I/O controller 28 and a network interface 29, such as a conventional modem. Web server 12 typically comprises a server computer connected to communication network 16 (e.g. the Internet, an intranet or other network) and on which is installed Web server software.

Web client 14 may be a personal computer or other data processing device that is capable of running a Web browser program 15. Typically, the web client includes a processor 30, memory 32 (e.g. RAM), a bus 34 that couples the processor 30 and memory 32, a mass storage device 36 (e.g. a magnetic hard disk or an optical storage disk) coupled to the processor 30 and memory through an I/O controller 38 and a network interface 39 (e.g. a conventional modem). Memory 32 supports a number of internet access tools including an HTTP compliant Web browser 15. Web browser 15 is a software program that allows Web client 14 to communicate with Web server 12 to enable access to and viewing of HTML documents and other web resources.

Web server 12 operates a "Web site" that supports files in the forms of HTML documents and pages, and other web resources. The Web server software is configured with the host name of Web server 12 and the location of HTML documents stored by Web server 12 and those stored on other servers. Web browser 15 uses a particular URL to find and fetch resources from the Internet and the WWW. In addition to HTML code, HTML documents can incorporate other information content, such as images, audio, video, executable programs, etc. (shown as "images"), which typically reside at Web server 12 but may reside on other computers connected to communication network 16. In the preferred embodiment, web resources 40 such as an HTML document and images are stored as files in a file system 41 of Web server 12. The HTML document embeds the images using HTML tags that specify the location of files or other Internet resources.

As shown in FIG. 2, the file system also contains a file 44 containing a set of run level values that are assigned to web resources of the web server. This file may be defined by the web page developer at the time of development of the web page. Alternatively, this allocation may be achieved using style sheets or a set of rules and these will be discussed in more detail later on. The run level values denote the importance of a given web resource.

Accordingly, to access a Web page, a Web page request is entered by a user 50 specifying a URL via Web browser 15 on Web client 14. The user can send a URL over the WWW by selecting a Web page link, or the user can enter the entire URL address manually into Web browser 15. When user at Web client 14 sends a URL, for example www.ibm.com, from Web client 14 this URL is sent and travels across the WWW (over communications network 16), contacting Web server www.ibm.com, as specified in the URL. Specifically, Web client 14 makes a TCP/IP request (i.e. the URL is sent to Web server 12 using HTTP) to Web server 12. The URL provided by the application refers to an HTML document 40 stored on Web server 12, which in this example describes the home page of the www.ibm.com website.

Web server 12 responds by locating the requested HTML document 40 and returning it to the browser on Web client 14. The server thus sends the file called index.html and the browser starts rendering index.html as it comes across, and starts building an index of any embedded files it needs. The browser then issues GET commands for each other file it needs and renders them into the page as it receives them.

Figure 3:
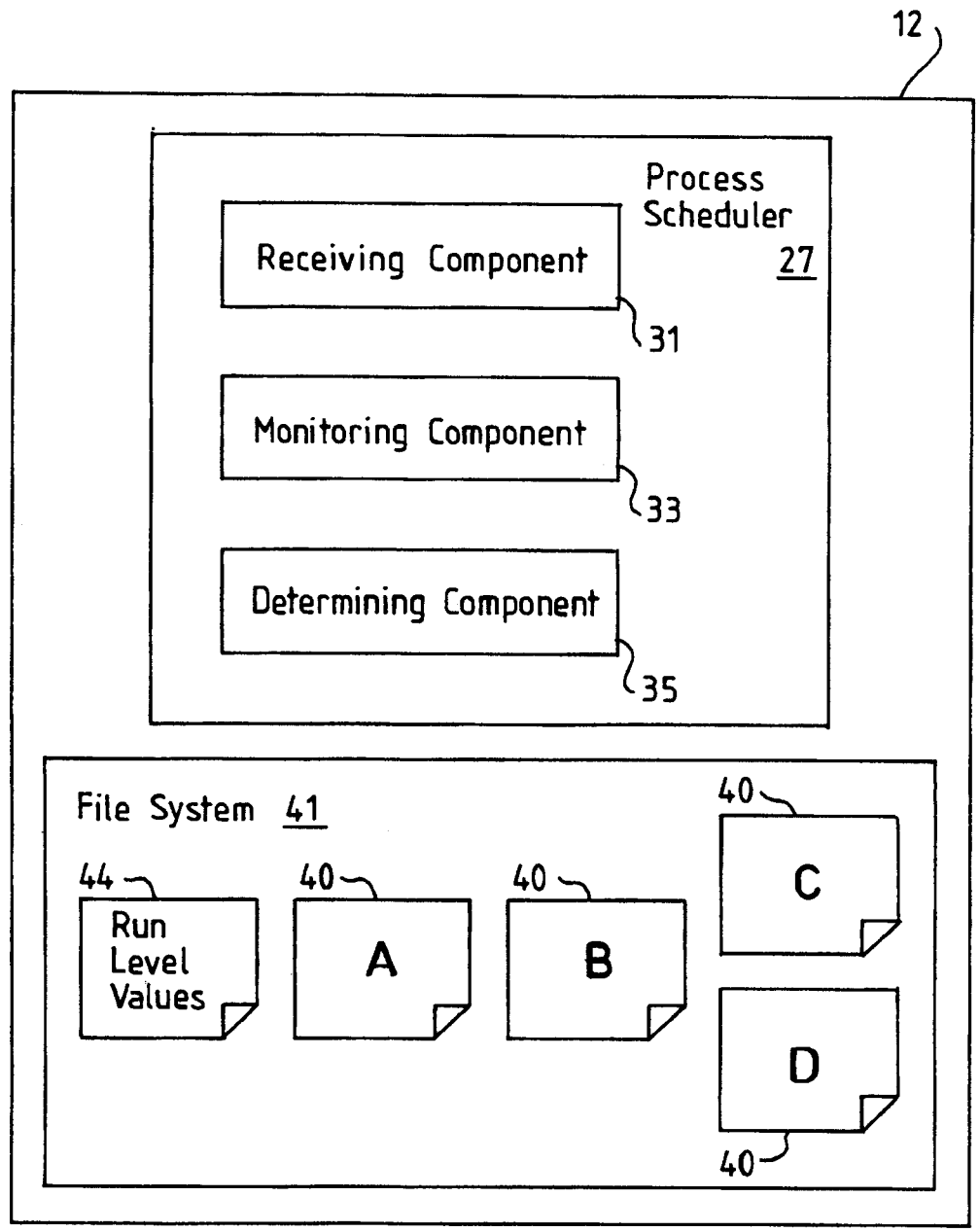
FIG. 3 shows a schematic of the components comprising a system according to a preferred embodiment of the invention.

The web server uses a process scheduler to prioritise and schedule the processing of the requests which it receives. As shown in FIG. 3, the process scheduler 27 comprises a receiving component 31, a monitoring component 33 and a determining component 35.

Figure 4:
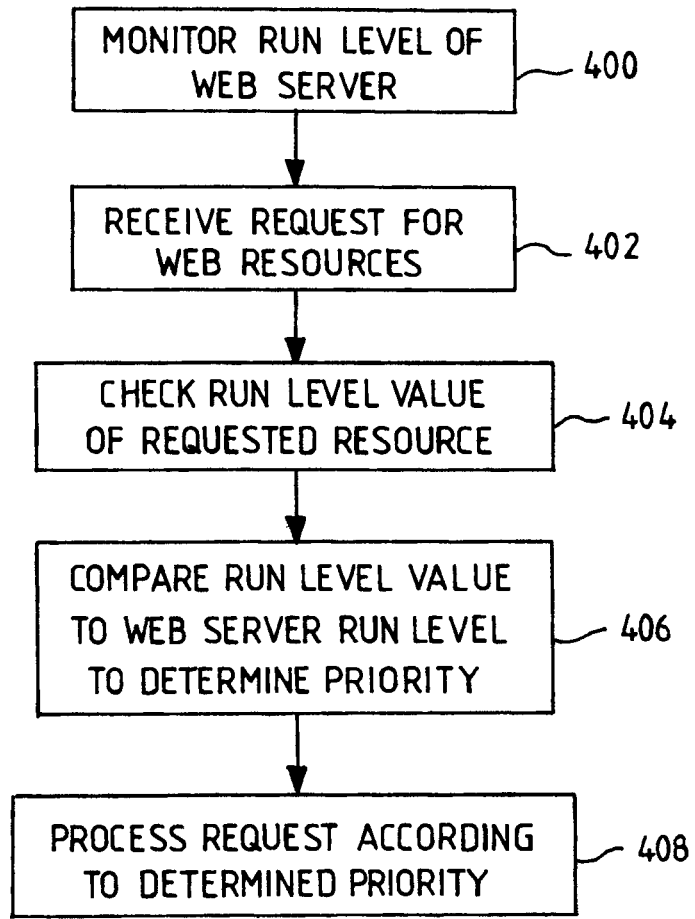
FIG. 4 shows a flowchart indicating the steps of a method according to a preferred embodiment of the invention.

Referring to FIG. 4 the method of processing requests using the system of FIG. 3 will be described. The monitoring component monitors 400 a run level of the web server 12. The receiving component receives 402 requests for resources 40, such as A, B, C and D. For each request, the determining component determines 404 whether a requested resource has an allocated run level value, for example by looking up the resource in the run level value file 44. The determining component then compares 406 the run level value of the requested resource to the current run level of the web server, and in dependence on the comparison determines the priority with which the request should be processed. The requests are then processed 408 according to the determined priority.

Determining a priority may comprise allocating a low priority to processing of the request if the run level value of the requested resource is greater than the current run level of the web server, and a high priority if it is less than or equal to the run level of the web server.

In the preferred embodiment, multiple requests are processed using multithreading, in which multiple threads of execution are processed in parallel. This multithreading may occur by time slicing (where a single processor switches between different threads) or by multiprocessing (where threads are executed on separate processors). The process scheduler 27 assigns priorities to the requests it receives. Typically, it also assigns the processing of particular requests to particular threads in accordance with the assigned priority. The number and relevance of run level values can be customizable, with common choices provided and easily set up. For example, a simple web site may use four run level values: 1 (top priority) classifying all critical content, mostly this would be articles, portals of most business need; 2 representing side-bar tools for related information; 3 for site navigation; and 4 (bottom priority) for additional graphics and non critical content.

The run level of the web server monitored by the monitoring component gives an indication of the load on the web server and may be a function of one or more of such variables as CPU utilization, memory usage, and/or number of 'hits' in the last 'n' minutes. In an example where processor utilization is being used to effect run-level, a server may have four run levels 1-4, defined as follows:

| Run level | CPU usage |
|---|---|
| 4 | less than 50% |
| 3 | 50%–79% |
| 2 | 80%–89% |
| 1 | 90%–100% |

Consider a web page containing four web resources, A, B, C and D. A contains the HTML for a news article and is given a run level value of 1 to indicate that this content is considered important; B is an image relating to the news article and is allocated a run level value of 2; C is another image, considered less important than image B, and allocated a run level value of 3; and D is a sidebar of links to other web resources and this is allocated a run level value of 4.

During normal operation, the web server is at run level 4. The determining component ascertains that all resources of the website have a run level value that is less or equal to the run level of the web server and the server processes all requests normally, typically in the order in which they were received, and thus delivers all content normally.

When the processor utilisation hits 80% the web server run-level is adjusted to 2. At this point a number of options are available to the server. In a preferred embodiment, the process scheduler hands requests for resources to particular thread pools based on the run level value of that resource. Requests for resources, such as D, having the lowest run level value (4) are handed by the process scheduler to low priority threads or even ignored, whilst requests for resources having a run level value of 2 or less, such as A and B, are handed to higher priority threads. The response from a low priority thread will be much slower but will eventually deliver that item.

When the processor utilisation exceeds 90% the web server run level changes to 1. Then requests for resources having run level values of 2, 3, or 4, such as B, C, and D, are handed to low priority threads, or possibly ignored, with processing priority given to requests for resources having a run level value of 1, such as A. This means more processor power can be allocated to processing the value 1 items than the value 2, 3, and 4 items at times of peak load on the web server. How much more is a matter of tuning and configuration.

By passing requests for the top value items to a thread pool with the highest priority, the most important content receives the largest processing resource, whilst lesser items take longer. This effectively sequences what is downloaded such that in times of high load it is likely that the relevant information is received first. In times of unusually large load where many site visitors are really only interested in the main body of the page, many will have got what they wanted and left, without needing to further load the server by attempting multiple refreshes until the primary content is delivered.

Processing a low priority request by ignoring the request provides the fastest solution, but would leave blank areas of the screen and thus could look broken to a user. Processing a low priority request could also involve returning an auto-timed out response for that resource. Alternatively, the server could switch to only delivering 'alternate text' versions of those resources having a run level value higher than the run level of the server. This would allow a low-resolution display of those parts of a page deemed unimportant, and normal display of the high priority items.

If an item having a run level value above the current web server run level is a dynamically generated item, such as a portlet, the server could elect to call the portlet to deliver content once (possibly at the point the run level changes) and store its response as a temporary static file, and then return this file on all requests to that dynamic content. This static version could then be refreshed every n minutes, or simply left static until the run level of the web server returns to a level at which the item is processed normally.

The actions to be taken when a request arrives for a resource having a run level value above the current run level of the server may be made available as configuration options to be varied by a web site owner or developer. This configuration can include the number of run levels to use, and the mechanism by which to determine them. Obviously, one could have a large number of run levels to have very granular control, but more likely it will break down to four or five. Moreover, there may be a different number of run levels of the server than the number of different run level values allocated to resources.

The monitoring component may monitor the web server load periodically, so perhaps every ten minutes a check is taken of the number of connections received in the last ten minutes. Alternatively, an average processor utilization for that period may be checked. In any case a number of load threshold values can be assigned to each run level. When the server reaches a particular load threshold the run level is updated accordingly and all the items flagged under the current run level must be handled differently.

The process may be further stepped, such that one action is taken if a resource has a run level value one greater than the current run level, but a different, cheaper action is taken for a resource that has a value more than one greater than the run level of the server.

The run level values could be allocated to the web resources in a number of different ways. One possible method utilizes a stylesheet to assign run level values to parts of a web page. This could be done by adding run level value attributes to an existing stylesheet for a web page or by using an additional 'stylesheet', which contains data identifying the run level value allocated to each resource of a web page. The latter option may prove to be simpler than incorporating the run level values into a stylesheet. It is proposed that a web page developer would be provided with a Graphical User Interface tool that would allow run level value allocation to various parts of a web page based on a stylesheet. The stylesheet would typically be stored as a file 44 in the file system 41 of the web server.

Alternatively, the run level values could be allocated to resources based on a set of rules. For example run level values may be allocated depending on the file type of each resource. That is, all text files may be allocated a high run level value, say 1, with all image files being allocated a different run level value, say 3. A table, such as a hash table, which lists run level value allocations for each resource of a web site hosted by the web server may be generated. This may be produced dynamically at runtime, or, more preferably, generated beforehand and stored locally as the run level value file 44 in the file system 41.

By making the current system run level available as a system property, intelligent 'run-level aware' applications can be developed, that would further allow control over content creation based on load. That is, something that would normally query a database, make web service calls etc, could determine that at the current system run level it is more appropriate to return a static response. By utilizing this process, requests for important content will receive the priority of the server and the resolution of the site will gradually reduce under load, making the best possible use of available resource to meet customer demand.

Insofar as embodiments of the invention described are implementable, at least in part, using a software-controlled programmable processing device or, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation.

It will be understood by those skilled in the art that, although the present invention has been described in relation to the preceding example embodiments, the invention is not limited thereto and that there are many possible variations and modifications that fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims, is not to be construed as meaning "consisting only of".

The invention claimed is:

1. A method for controlling the processing of requests for web resources from a web server, the method comprising:
   assigning a different run level value for each of the web resources, the run level value comprising a numerical value and denoting a level of importance for each web resource in relation to other web resources;
   monitoring, by the web server, a run level of the web server, the run level of the web server comprising a numerical value and indicating a load on the web server;
   receiving, by the web server, a request for one of the web resources;
   comparing, by the web server, the assigned run level value of the requested one of the web resources with the current run level of the web server upon determining the level of importance of the requested one of the web resources and a current load of the web server;
   determining, by the web server, a priority of the received request based on the comparison by determining whether the numerical value corresponding to the assigned run level value is less than, greater than, or equal to the numerical value corresponding to the current run level of the web server, allocating a low priority to the request upon determining that the numerical value corresponding to the assigned run level value is greater than the numerical value corresponding to the current run level of the web server, but allocating a high priority to the request upon determining that the numerical value corresponding to the assigned run level value is less than or equal to the numerical value corresponding to the current run level of the web server; and
   processing, by the web server, the received request by the web server according to the determined priority.

2. The method according to claim 1, wherein processing the received request according to the determined priority includes ignoring the received request when the received request is determined to have a low priority.

3. The method according to claim 1, further comprising storing said assigned run level values in a run level value file.

4. The method according to claim 1, wherein multiple processing threads are provided for processing requests, a particular processing thread being selected to process the received request, according to the determined priority.

5. The method according to claim 1, in which processing of a low priority request comprises generating a response comprising an alternate web resource rather than the requested resource.

6. The method according to claim 1, in which processing of a low priority request comprises generating a timed-out response message.

7. The method according to claim 1, comprising transmitting one or more responses to the received requests.

8. A system for controlling the processing of requests for web page resources from a web server, the system comprising:
   a processor configured to:
      assign a run level value for each of the web page resources, the run level value comprising a numerical value and denoting a level of importance for each web page resource in relation to other web page resources;
      monitor a run level of the web server, the run level of the web server indicating a load on the web server;

receive a request for one of the web page resources;

compare the assigned run level value of the requested one of the web page resources with the current run level of the web server upon determining the level of importance of the requested one of the web page resources and a current load of the web server;

determine a priority of the received request based on the comparison, by determining whether the numerical value corresponding to the assigned run level value is less than, greater than, or equal to the numerical value corresponding to the current run level of the web server, allocating a low priority to the request upon determining that the numerical value corresponding to the assigned run level value is greater than the numerical value corresponding to the current run level of the web server, but allocating a high priority to the request upon determining that the numerical value corresponding to the assigned run level value is less than or equal to the numerical value corresponding to the current run level of the web server; and process the received request by the web server according to the determined priority.

9. The system according to claim 8, wherein processing the received request according to the determined priority includes ignoring the received request when the received request is determined to have a low priority.

10. The system according to claim 8, wherein a plurality of processing threads are provided for processing requests, a particular processing thread being selected to process the received request according to the determined priority.

11. The system according to any claim 8, wherein the processor is further configured to transmit responses from the web server to a web client.

12. A computer program product comprising a non-transitory computer readable storage medium having stored thereon computer readable code comprising computer-executable instructions for controlling the processing of requests for web resources from a web server, the computer readable code, when executed by a computer hardware system, cause the computer hardware system to perform:

assigning a run level value for each of the web resources, the run level value comprising a numerical value and denoting a level of importance for each web resources in relation to other web resources;

monitoring a run level of the web server, the run level of the web server comprising a numerical value and indicating a load on the web server;

receiving a request for one of the web resources;

comparing the assigned run level value of the requested one of the web resources with the current run level of the web server upon determining the level of importance of the requested one of the web resources and a current load of the web server;

determining a priority of the received request based on the comparison, by determining whether the numerical value corresponding to the assigned run level value is less than, greater than, or equal to the numerical value corresponding to the current run level of the web server, allocating a low priority to the request upon determining that the numerical value corresponding to the assigned run level value is greater than the numerical value corresponding to the current run level of the web server, but allocating a high priority to the request upon determining that the numerical value corresponding to the assigned run level value is less than or equal to the numerical value corresponding to the current run level of the web server; and processing the received request by the web server according to the determined priority.

13. The product according to claim 12, wherein processing the received request according to the determined priority includes ignoring the received request when the received request is determined to have a low priority.

14. The product according to claim 12, further comprising storing said assigned run level values in a run level value file.

15. The product according to claim 12, further comprising multiple processing threads are provided for processing requests, a particular processing thread being selected to process the received request, according to the determined priority.

16. The product according to claim 12, in which processing a low priority request comprises generating a response comprising an alternate web resource rather than the requested resource.

17. The product according to claim 12, in which processing a low priority request comprises generating a timed-out response message.

18. A method for controlling the processing of requests for web resources from a web server, the method comprising:

monitoring, by the web server, a contemporaneous run level of the web server, the contemporaneous run level comprising a numerical value and indicating a current load on the web server;

receiving, by the web server, a first request for a first resource having a first allocated run level value, the first allocated run level value comprising a numerical value and denoting a level of importance of the first resource in relation to a second resource that is different than the first resource;

receiving, by the web server, a second request for the second resource having a second allocated run level value that is different than the first allocated run level value, the second allocated run level value comprising a numerical value and denoting a level of importance of the second resource in relation to the first resource;

comparing the first and second allocated run levels with the contemporaneous run level of the web server upon determining the level of importance of the first resource, the level of importance of the second resource, and also the current load of the web server;

prioritizing the first and second requests based upon the comparison by determining whether the numerical value corresponding to the first allocated run level value is less than, greater than, or equal to the numerical value corresponding to the contemporaneous run level of the web server, allocating a low priority to the first and second requests upon determining that the numerical value corresponding to the first allocated run level value is greater than the numerical value corresponding to the contemporaneous run level of the web server, but allocating a high priority to the first and second requests upon determining that the numerical value corresponding to the first allocated run level value is less than or equal to the numerical value corresponding to the contemporaneous run level of the web server.

19. The method according to claim 18, wherein
the processing includes ignoring requests for resources having a pre-specified allocated run level.

20. The method according to claim 18, wherein
the processing is handled by multiple processing threads, and a particular processing thread being selected to process a particular received request according to the prioritizing.

* * * * *